Oct. 29, 1963    C. VAN DER LELY ETAL    3,108,425
CONVERTIBLE SIDE DELIVERY RAKE
Original Filed Nov. 28, 1955    2 Sheets-Sheet 1

INVENTOR.
CORNELIS & ARY VAN DER LELY
BY
Mason, Mason & Albright

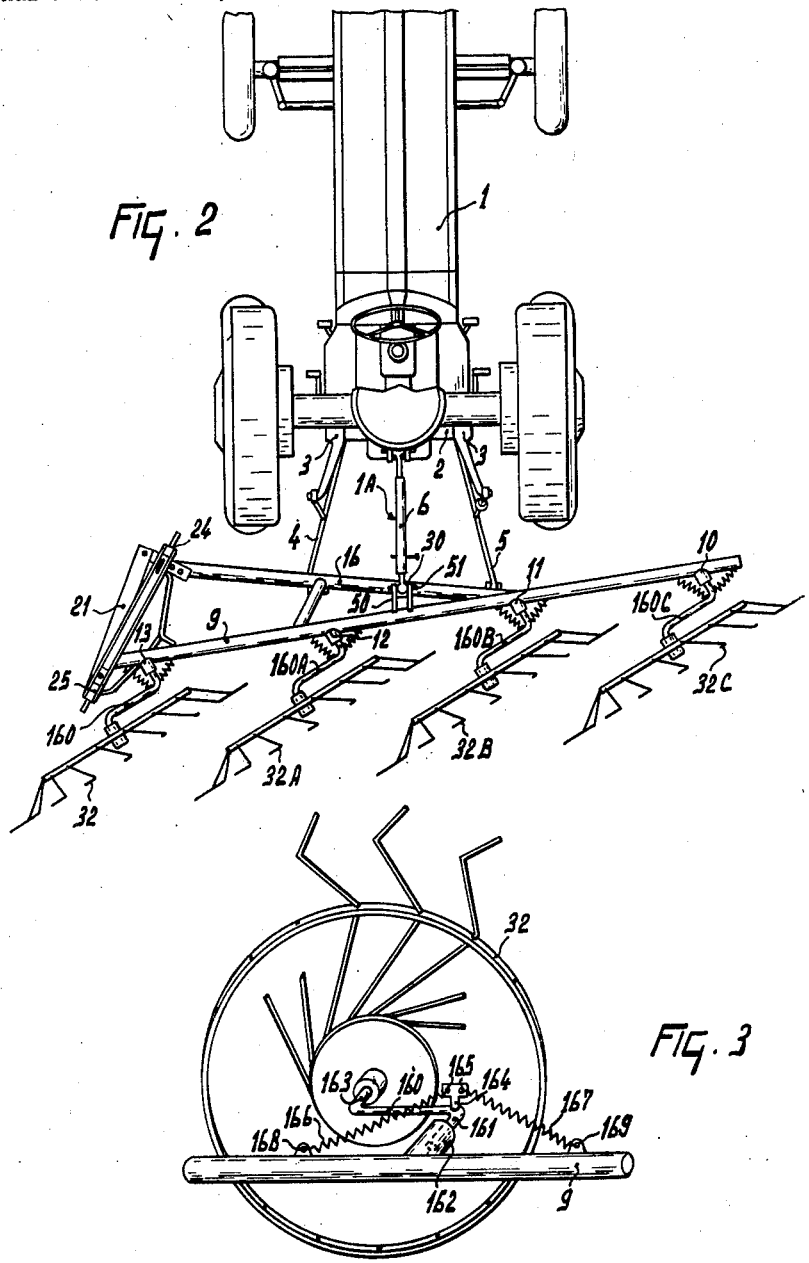

United States Patent Office 3,108,425
Patented Oct. 29, 1963

3,108,425
CONVERTIBLE SIDE DELIVERY RAKE
Cornelis van der Lely, Zug, Switzerland, and Ary van der Lely, Maasland, Netherlands, assignors to C. van der Lely N.V., Maasland, Netherlands, a Dutch limited-liability company
Original application Nov. 28, 1955, Ser. No. 549,482, now Patent No. 2,933,878, dated Apr. 26, 1960. Divided and this application Apr. 14, 1960, Ser. No. 22,245
7 Claims. (Cl. 56—377)

This invention relates to a raking device having a row of rake wheels mounted on crank arms which are freely movable up and down in encountering uneven ground. In the known implements of this kind, a spring is associated with each crank which urges the rake wheel upwardly and thus reduces the pressure of the rake wheel on the ground.

It is an object of the invention to improve the suspension of the rake wheels on the above described implement. A further object of the invention is to provide an implement as set forth wherein the supporting members of the rake wheels can conveniently be mounted on a frame which may be inverted to obtain another working position of the implement.

Briefly, the invention relates to a rake comprising a frame, a plurality of cranks each mounted on said frame and mounting a rake wheel, resilient means in tension extending on at least one side of each of said cranks for reducing the pressure of the rake wheels on the ground, and means mounted on each of the cranks for limiting their upward movement. Preferably, the means for limiting the upward movement of the cranks will be spring means.

According to a further embodiment of the invention, the raking device comprises a frame, a plurality of rake wheels in echelon, a plurality of cranks each mounted on the frame and mounting one of the rake wheels, a pair of resilient means such as springs in tension extending oppositely from each of the cranks and being connected to said frame on opposite sides whereby the resilient means resists both clockwise and counter-clockwise movement by the cranks.

This is a division of application Serial No. 549,482, which issued as Patent No. 2,933,878 on April 26, 1960.

In order that the invention may be clearly understood and readily carried into effect, reference will now be made by way of example to the accompanying drawings in which:

FIGURE 2 shows a plan view of the implement in working position to serve as a tedder; and FIGURE 3 shows a perspective diagrammatic view of a detail of the implement shown in FIGURES 1 and 2.

Figure 1:
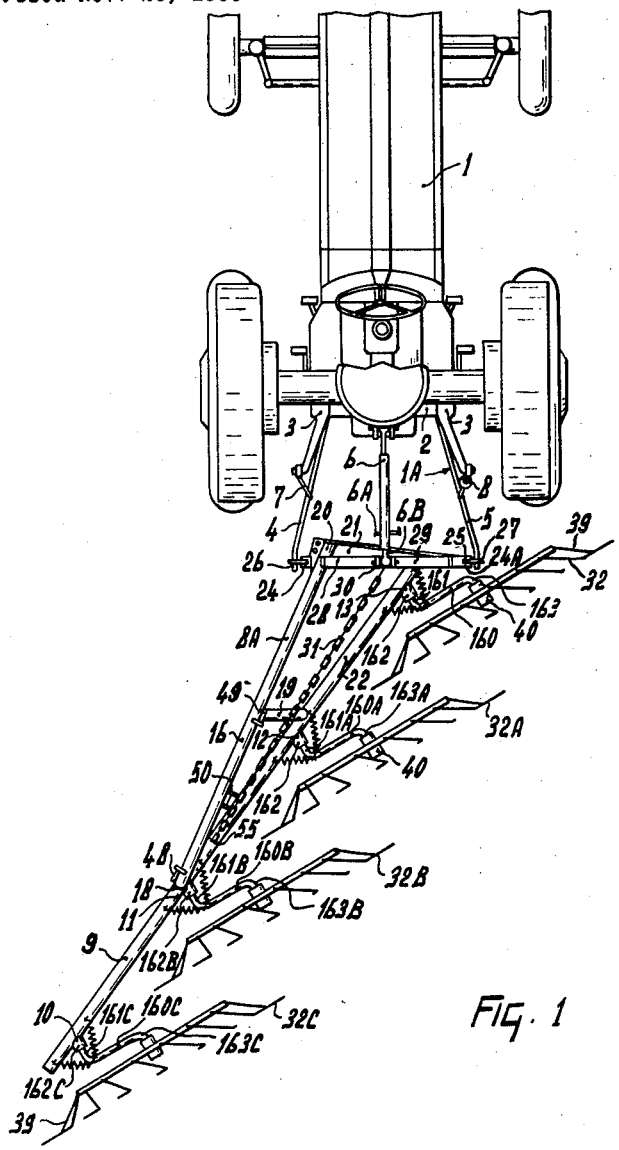
FIGURE 1 shows a plan view of an implement attached to a tractor, the implement being in working position to serve as a side delivery rake.

Referring to the figures, a tractor 1 has a rear portion 2, which is provided with a three-point lifting device 1A comprising two arms 3 which can be raised and lowered by means of the tractor engine, and three links 4, 5 and 6. The latter are pivotally secured to the rear portion 2 of the tractor, the links 4 and 5 being substantially co-planar and being suspended from the free ends of arms 3 by means of tie rods 7 and 8. Link 6, the length of which is adjustable by a telescopic connection with bar 6B, is located between links 4 and 5, but at a higher level. The length of link 6 can be secured by pin 6A.

The implement attached to the tractor 1 includes a frame 8A substantially consisting of a horizontal tube 9 on which four cranks 160, 160A, 160B and 160C are mounted at 10, 11, 12 and 13, respectively, on tube 9. A further tube 16, one end 17 of which is bent vertically downwards, is attached to the tube 9 at 18. The tubes 9 and 16 are additionally interconnected at a distance from 18 by means of a short tube 19. The other end 20 of tube 16 is connected to the adjacent end 22 of tube 9 by means of a horizontal bar 21. An axle 24A having ends 24 and 25 is adjustably connected to the bar 21 in such a way that the angle which the tube 9 makes in a horizontal plane and with the longitudinal axis of the tractor 1 can be modified within certain limits. Ends 24 and 25 are hinged about the free ends 26 and 27 of links 4 and 5, respectively. Two supporting bars 28 and 29, located in the same vertical plane and extending obliquely upwards from near the ends 24 and 25, respectively, are hinged at their upper ends to the link end 30 and at their lower ends to frame 8A. A chain 31 extends from the link end 30 to a hook 55 attached near 18 to tube 9, which under certain circumstances carries part of the weight of frame 8A.

Four rake wheels 32, 32A, 32B and 32C are rotatably mounted on tube 9. Rake wheels 32, 32A, 32B and 32C are connected to tube 9 of frame 8A by means of cranks 160, 160A, 160B and 160C, horizontal axles 161, 161A, 161B and 161C, which are rotatable in bearings 162, 162A, 162B and 162C, respectively, attached to tube 9. Each of the rake wheels 32, 32A, 32B and 32C is rotatably mounted on crank pin 163, 163A, 163B and 163C, respectively.

Referring specifically now to FIGURE 3, an arm 164 is attached to crank 160, and the free end of each of two springs 166 and 167 is hooked in the corresponding aperture 165 of arm 164. The other end of each of springs 166 and 167 is hooked in one of eyes 168 and 169 attached to tube 9 on opposite sides of the bearing 162. Springs 166 and 167 thus counteract one another. Spring 167 tends to raise the rake wheel while the spring 166 opposes the upward movement of rake wheel 32. As a result, rake wheel 32, upon deviation to either side of its equilibrium position, is urged back to that position. The construction shown in FIGURE 3 has the advantage that it can be used unchanged when the implement is inverted. Corresponding structure is employed to support rake wheels 32A, 32B and 32C.

Tube 16 of the frame of the implement carries two aligned pins 48 and 49 which can be fixed to the link ends 26 and 27 of the three-point lifting device.

In order to change the implement from the position where it serves as a side delivery rake (see FIG. 1) to the position where it serves as a tedder (see FIG. 2), supporting bars 28 and 29 and the axle 24A having the ends 24 and 25 are released from associated link ends 30, 26 and 27, respectively. Tube 9 carries a fork 50 which can be coupled, by means of a pin 51, to link end 30, but only if, first of all, the implement is inverted, since the fork 50 is situated at a lower level than pins 48 and 49.

In the position shown in FIGURES 1 and 2, the implement is supported by links 4 and 5 and by rake wheels 32, 32A, 32B and 32C, the frame being movable about the axis of the pins carried by the ends 24 and 25. In the latter working position no force is exerted on link 6 because chain 31 is normally slack when the implement is in operation. Chain 31 can be easily shortened or lengthened by connecting various links of the chain to the hook 55. When the implement is raised by means of the lifting device, chain 31 will be tensioned and will limit the angle between the frame and supporting bars 28 and 29, whereupon rake wheels 32, 32A, 32B and 32C will leave the ground so that the implement can be transported.

When the implement serves as a side delivery rake, material on the ground is delivered to the left (see FIG. 1) during forward movement by means of rake wheels 32, 32A, 32B and 32C. When the implement works as a tedder each rake wheel 32, 32A, 32B and 32C clears the material from a narrow strip of ground. The worked strips may be very close together if the distance between the cranks 160, 160A, 160B and 160C is chosen to give that result.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

We claim:

1. A raking device comprising a frame, coupling means included on said frame for coupling it to a three-point linkage of a tractor, a plurality of rake wheels in echelon, a plurality of cranks each journaled with respect to said frame and mounting one of said rake wheels, resilient means in tension extending from a part of each of said cranks to said frame, said means reducing the pressure of said rake wheels on the ground, said part spaced from the axis of rotation of its respective crank relative to said frame, and further resilient means mounted on each of said cranks for restricting the upward movement of said cranks.

2. A raking device as set forth in claim 1, wherein said means for restricting the upward movement of said cranks consist of spring means.

3. A raking device comprising a frame, coupling means included on said frame for supportably coupling it to the linkage of a tractor, a plurality of rake wheels in echelon, a plurality of cranks each journaled with respect to said frame and mounting one of said rake wheels, a pair of resilient means in tension extending oppositely from each of said cranks and being connected to said frame on opposite sides, whereby said cranks will resiliently resist movement in both clockwise and counter-clockwise directions, said resilient means being connected to each of said cranks at a place out of alignment with the axis of rotation of the respective crank relative to said frame.

4. A rake as set forth in claim 3, wherein said pair of resilient means are connected to said frame on opposite sides of the place where the corresponding crank is journaled with respect to said frame.

5. A convertible side delivery rake comprising a frame, a pair of coupling means included at different places on said frame for supportably coupling it to the linkage of a tractor, a plurality of cranks journaled with respect to said frame, a plurality of rake wheels mounted in echelon on said cranks, an arm extending vertically from each of said cranks, at least two springs extending oppositely from said arm, at a place out of alignment with the axis of rotation of said crank to said frame, whereby said springs resist both clockwise and counter-clockwise movement by said cranks and the rake may be converted to a tedder by inverting it.

6. A rake for side delivery of hay and other material lying on the ground in one position and for tedding in an inverted position comprising a frame, a pair of coupling means included at different places on said frame for coupling it to the lift linkage of a tractor, a plurality of cranks journaled in respect to one side of said frame, a row of rake wheels mounted in echelon on said cranks, an arm extending vertically from each of said cranks, pairs of opposing springs connected to each arm at a place out of alignment with the axis of rotation of the crank from which the arm extends and to said frame whereby said springs resist both clockwise and counter-clockwise movement of said cranks, said rake wheels constituting support means for said frame.

7. A raking device comprising a frame including a substantially straight beam, a first coupling means included on said frame substantially at one end of said beam, a second coupling means included on said frame substantially midway on said beam, both said coupling means for selective coupling of said frame to the lift linkage of a tractor, a plurality of rake wheels in echelon, a plurality of cranks, each of said cranks journaled to said beam on one side thereof and rotatably mounting one of said rake wheels or arm extending vertically from each of said cranks, a pair of resilient means in tension extending oppositely from each of said arms from a place thereon out of alignment from the axis of rotation of the arm from which it extends and being connected to said frame on opposite sides whereby rotary movement of said cranks. is resisted in both the clockwise and counter-clockwise directions.

References Cited in the file of this patent

UNITED STATES PATENTS

| | | |
|---|---|---|
| 2,635,411 | Hicks | Apr. 21, 1953 |
| 2,680,343 | Enos | June 8, 1954 |

FOREIGN PATENTS

| | | |
|---|---|---|
| 1,079,494 | France | May 19, 1954 |